United States Patent

[11] 3,586,087

[72] Inventors James W. Messerly, Stow; Le Roy J. Vandenberg, Cuyahoga Falls, both of, Ohio
[21] Appl. No. 772,837
[22] Filed Nov. 1, 1968
[45] Patented June 22, 1971
[73] Assignee The B. F. Goodrich Company New York, N.Y.

[54] TIRE
2 Claims, No Drawings

[52] U.S. Cl. .................................................. 152/330, 260/2.3, 260/5, 260/33.6 AQ, 260/41.5 R, 260/846, 260/888
[51] Int. Cl. ........................................................ B60c 1/00, C08c 15/00
[50] Field of Search ............................................ 260/888, 887, 49, 2.3; 152/330

[56] References Cited
UNITED STATES PATENTS

| | | | |
|---|---|---|---|
| 3,104,235 | 9/1963 | Kuntz et al. | 260/85.3 |
| 3,341,491 | 9/1967 | Robinson et al. | 260/2 |
| 3,351,517 | 11/1967 | Willis | 260/3 |

OTHER REFERENCES

" Synthetic Rubber," Whitby, John Wiley and Sons, N.Y., N.Y. 1954 pages 608 & 609

Primary Examiner—Samuel H. Blech
Attorneys—R. W. Wilson and J. Hughes Powell, Jr.

ABSTRACT: A superior tire, particularly of the tubeless variety, has a rubber/fabric carcass the inner air-contacting surfaces of which are lined or covered with an integral, extensible, vulcanized rubbery composition based on a blend of (1) a halogenated butyl rubber and (2) a rubbery epihalohydrin homopolymer such as polyepichlorohydrin plus a moderately high proportion of a soft, medium structure carbon black and said composition is cured or vulcanized by means of a nonsulfur curing system consisting of a mercaptoimidazoline curative and magnesium oxide. Such tires not only wear longer in service but also fail less frequently due to liner and/or intrafly separation because of superior resistance of the liner to air diffusion and all around greater integrity, stability and aging characteristics of the liner.

TIRE

CROSS-REFERENCES TO RELATED APPLICATIONS

Copending application, Ser. No 772,829, in the name of John T. Oetzel, of even date herewith, discloses and claims a range of blends of an epihalohydrin copolymer rubbers and minor proportion of halogenated butyl rubbers having a special balance of solvent resistance and low-temperature characteristics.

BACKGROUND OF THE INVENTION

Tires made of the many and varied natural and synthetic rubbers are subject to failure due to high-pressure air from inside the tire working its way into the interior fabric-containing plies of the tire and effecting separation thereof. The use of a tube inside the tire made of a low air diffusion rubber such as butyl rubber eliminates much of this difficulty but tube failures are common.

The advent of tubeless tires in the late 1940's emphasized these difficulties with air penetration of the interior plies. At first, development was directed to tire liner compounds based on mixtures of butyl rubber (for low air permeability) and natural rubber (good adhesion; good physical properties). While these were an improvement such liners were found not completely satisfactory because of low and/or unpredictable adhesion and difficulties in processing and in the building of the tires. The availability of halogenated butyl rubber such as after-chlorinated butyl rubber as a substitute for butyl rubber in tire liners was a further improvement but not, however, a complete solution since the resistance to air diffusion of this rubber is less than that of butyl rubber. Moreover, chlorobutyl rubbers are not easy to mix, compound, calender and adhere permanently to tire carcasses. Commercial chlorobutyl rubbers are sticky or apt to become sticky during processing, they are of low or marginal molecular weight, and are of marginal stability. Liner compounds based on chlorobutyl rubber have a tendency to be too soft during the high-temperature cure of the tire such that the liner material is apt to be driven into the interior plies of the tire during a bladder-type cure. When the latter happens the tire is apt to fail by ply separation. Examination of tires from many sources having chlorobutyl rubber liners show in even a short service life a high proportion of the liners to be cracked and hence not fully effective as an air barrier.

Tire liner compositions based on blends of chlorobutyl rubber with either or both of natural rubber or reclaimed butyl rubber are a source of continuing difficulty due to any of low processing quality particularly during calendering, marginal adhesion, sensitivity to humidity and/or entrapment of air and moisture, and other, perhaps unknown reasons. A continued significant incidence of blistered liners noted after cure and liner cracking in service continue to be observed.

All of the above and other difficulties are aggravated in recent years by steadily increasing severity of tire service and by the continued increase in average tire size. Tubeless truck tires and tubeless varieties of the large off-the-road types continue to suffer from tire liner deficiencies. The larger the tire and the thicker its cross-sectional area, the more serious is intraply air migration. It is clear that there is continuing need for better tires and, particularly for tubeless tires having superior tire liner construction and composition. So serious is this need that there have been consideration recently of the compulsory use of nitrogen instead of air to inflate tires. Pressurized nitrogen, in such situation, would penetrate the inner plys of conventional tires just about as easily as air and the incidence of tire failure by ply separation due to tire liner plies of inferior air or gas resistance or tire liner plies of insufficient stability to heat would be about the same.

SUMMARY OF THE INVENTION

We have found that a superior tire is produced having an integral, extensible lining or covering (hereinafter "liner" or "liner ply") covering its inner surfaces normally in contact with high-pressure air or gas during service. Such liner ply is a rubbery extensible, and vulcanized carbon black containing composition based on a blend of certain proportions of several special purpose rubbers consisting of, as essential rubbery constituents, (1) a halogenated butyl rubber and (2) a rubbery epihalohydrin homopolymer and, optionally, (3) reclaimed butyl rubber. Such composition is vulcanized not by conventional sulfur/accelerator systems but rather by a special nonsulfur vulcanization system consisting of a mixture of (a) a mercaptoimidazoline curative such as ethylene thiourea and (b) magnesium oxide. Such a vulcanized composition is very resistant to air diffusion and is possessed of a stability to hear, oxygen, flexure and other dynamic deleterious influences which is one or more magnitudes greater than other known tire liner compositions. As a result, the tires of this invention evidence good service life and little tendency to fail by ply separation, tread separation or failure of liner adhesion or by liner blistering or cracking. The production of the tires of this invention are much facilitated by the very good processing behavior of the stock and its good handling characteristics both during building of the tire and during cure of the tire. Such tires can be cured or vulcanized by the bladder type and bladderless types of equipment with few, if any, blistered liners. We have also found that such a tire construction is especially valuable in the larger types of tubeless tires such as in the larger tubeless truck tires and tubeless off-the-road or earthmover tires. These advantages are observed with tires made with rayon, nylon and polyester tire cords.

We have confirmed these results on a large scale and by intensive destructive testing of considerable numbers of tires of this construction. This testing has confirmed that the liner is markedly superior in resistance to heat aging, in resistance to air transmission as shown by markedly lower intraply tire pressures and has satisfactory adhesion to the tire plies. The resistance to aging and/or deterioration by heat and flexing is outstanding. The liner composition remains flexible and of good integrity after heat aging for 88 hours at 250° F. whereas other known liner compositions are brittle and cracked after such treatment. Tires of this invention heat aged for 2 weeks at 158° F. before being tested outlasted similarly heat-aged control tires having chlorobutyl/butyl reclaim liners by a substantial margin. At both ordinary and elevated temperatures, intraply tire pressures in the tires of this invention are only one-half or less than those obtained in control tires. The thickness of the liner ply can be reduced, if desired, producing a tire of thinner cross section but equivalent or better load-carrying capability.

DETAILED DESCRIPTION

The tires of this invention comprise a vehicle tire, preferably of the rubber and fabric tubeless variety, provided with an integral inner liner ply overlying all inner surfaces of the tire exposed to pressurized air or gas. Such ply is affixed to the tire in any operable way, preferably without adhesive, according to any method, by any equipment and to any tire construction because the material of such ply has such superior processing, handling and adhesive characteristics that none of such elements are at all critical in obtaining an improved tire.

LINER COMPOSITION

The material of such liner ply is, however, critical and unique. Such liner is composed of a combination of special-purpose synthetic rubbers cured with a specific "nonsulfur" (cure effected through nonsulfur crosslinks) curing system. The liner composition contains, as the essential rubbery constituents (1) from about 20 to about 85 parts/weight of a halogenated butyl rubber and (2) from about 15 to about 50 parts/weight of an epihalohydrin homopolymer rubber. If, desired, a reclaimed butyl rubber ingredient, in a proportion of from about 25 to about 65 parts/weight may be added to the above mixtures as a cost-reducing ingredient and as a processing aid.

A more preferred composition for the material of the liner ply, on a 100 parts/weight total rubber basis (100 PHR), is from about 30 to about 40 PHR of the halogenated butyl rubber, from about 20 to about 35 PHR of the epihalohydrin rubber, and from about 35 to about 55 PHR of a reclaimed butyl tube (fabric free) rubber.

The other essential ingredients of the liner ply are (1) a somewhat higher than normal proportion of one or more soft, medium structure carbon blacks such as "MT" (medium thermal black) and (2) the aforementioned mixed nonsulfur curative system. As respects carbon black, the total proportion of this ingredient may range from as little as about 40 to about 80 PHR with from about 55 to 70 PHR being preferred. Any carbon black or other nonrubbery filler and/or reinforcing ingredients in the reclaimed butyl rubber ingredient, if any, should be taken into account.

CURATIVE SYSTEM

As indicated above, only the curative system disclosed herein will produce the tires of this invention. Such system is specific, synergistic, unique and is believed to function by mechanisms other than by the generation of sulfur-rubber crosslinks. For this latter reason such system is sometimes referred to herein as a "nonsulfur cure system."

Numerous literature references to the contrary, the epihalohydrin rubber is not a sulfur-vulcanizable rubber. Likewise, the halobutyl rubber is not really or fully a sulfur-vulcanizable rubber because of its very low residual unsaturation. Rather, the halobutyl rubber appears to be a rubber curable by a metal oxide by reaction with allylic halogen atoms similar to those believed present in neoprene. It is believed, although proof of this is most difficult, that the curing system of this invention is a conjoint cure involving simultaneous mechanisms (or competing mechanisms) some of which may be (1) a metal oxide neoprene-type cure of the halobutyl rubber, (2) a metal oxide/mercaptoimidazoline or nonsulfur cure believed to involve nitrogen-carbon or carbon-to-carbon crosslinks in the epihalohydrin rubber, and perhaps (3) a metal oxide/mercaptoimidazoline type cure of the halobutyl rubber with or without (4) a very small amount of sulfur-cure of the halobutyl and/or reclaimed butyl constituents. The very great stability of the liner to heat, oxygen, ozone, flexure, etc. shown in tires of this invention is the best available evidence of uniqueness of the cure. Sulfur-rubber crosslinks in most other rubbery materials do not have this magnitude of stability. Thus, the combination of a particular cure system applied to a blend of two specific types of specialty rubber is believed to be responsible for the superiority of the liner ply composition and the tires of this invention.

The proportions of the two curing ingredients may vary from about 0.25 to about 1.5 parts by weight of the mercaptoimidazoline constituent and from about 0.75 to about 4.0 parts/weight of magnesium oxide, all based on 100 parts/weight of total rubbery material in the liner composition.

The mercaptoimidazoline curative ingredient is of the class of materials represented by thiourea, 2-mercaptoimidazoline, 2-mercaptopyridine, and the trialkyl-substituted thioureas. Of these, 2-mercaptoimidazoline (common name "ethylene thiourea") is particularly preferred.

HALOBUTYL RUBBER

The halobutyl rubber employed in this invention may be any of the common, commercially available grades produced by the after halogenation of a butyl (isobutylene-isoprene) rubber by addition of a molecular halogen.

Such materials include chloro-, bromo-, and iodo-butyl rubbers wherein from about 25 percent up to about 100 percent of the normal unsaturated groupings of a butyl rubber (usually, from about 0.5 to 3.0 mol percent isoprene residues) have been saturated by addition of a molecular halogen above atomic weight 35 and the splitting out of a corresponding hydrohalogen acid. A suitably commercially available chlorobutyl rubber contains from about 1.1 percent to about 1.35 percent/weight of chlorine (original isoprene content 1 to 2 mol percent) and has a Mooney viscosity after 8 minutes at 212° F. using the large (4-inch) rotor of 70 to 89 ML. A satisfactory bromobutyl rubber prepared from a highly unsaturated (2 to 3 mol percent isoprene) butyl rubber contains from 2.1 to 3.0 percent/weight of bromine, a density at 25° C. of about 0.96, and evidences a Mooney viscosity after 4 minutes at 212° F. of 50 to 70 ML.

EPIHALOHYDRIN RUBBER

This ingredient is a homopolymer of an epihalohydrin such as epichlorohydrin, epibromohydrin and others prepared by homopolymerizing the monomeric epihalohydrin with an organoaluminum catalyst such as a reaction product of water with an alkyl aluminum compound. Such homopolymers are believed to have a repeating structure

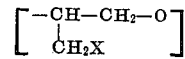

wherein X is a halogen, preferably a halogen above atomic number 35, derived by a polymerization involving the epoxide linkages. Copolymers of an epihalydrin with other monomers, and especially with alkylene oxides such as ethylene oxide do not have the requisite air impermeability and are inoperative in the tires and liner compositions of this invention. The operable homopolymers are strong, rubbery materials sometimes evidencing more or less crystallinity; having high molecular weight; a density in the range of from about 1.35 to about 1.38; which are free of gel; and which evident 4 min. 0 212° Mooney viscosity of from about 50 to about 80 ML. Such materials, their properties an their preparation are more fully disclosed in U.S. Pat. No. 3,158,580.

In addition to the essential and named optional ingredients, the liner composition should otherwise be compounded in accordance with known rubber-compounding principles by the incorporation of the required proportions of pigments, lubricants, plasticizers, softeners, stabilizers, antioxidants, antiozonants, tackifiers, etc., to suitably prepare the stock for the processing, stock calendering and tire building operations envisaged.

The invention shall now be further illustrated by means of several specific examples which are intended to be illustrative only and not as limiting the invention.

EXAMPLE I

The materials in the recipe below are employed in a liner stock for use in the tires of this invention. The three rubbery ingredients are combined in a banbury mixer and then the carbon black, magnesium oxide and other ingredients, except curatives, are added and mixing continued for several minutes to a stock discharge temperature of about 260° F. The stock is discharged onto a two-roll rubber mill having water-cooled rolls and the stock mixed on the mill with the two curatives. Lastly, the material is sheeted off for use in physical testing.

RECIPE

| Material | Parts/wt. | Phr. |
|---|---|---|
| Chlorobutyl rubber [1] | 40 | 33.3 |
| "Hydrin 100" [2] | 30 | 25.0 |
| Butyl tube reclaim | 50 | 41.6 |
| MT carbon black | 60 | 50.0 |
| Octylphenol/formaldehyde resin | 4 | 3.3 |
| Ethylene thiourea [3] | 0.75 | 0.63 |
| Paraffin base petroleum oil | 10.0 | 8.3 |

[1] "Enjay Butyl HT-10-68," made by Enjay Co.; chlorine content 1.1 to 1.3%/wt.; made from a butyl rubber of 1 to 2 mol percent isoprene units; Mooney viscosity (8' at 212° F.) of 70 to 89 ml.
[2] Trademarked product of B. F. Goodrich Chemical Company, a polyepichlorohydrin (homopolymer) rubber having a density of 1.36 and a Mooney viscosity (4' at 212° F.) of 50-70 ml.
[3] 2-mercaptoimidazoline, "NA-22" made by duPont.

By a similar procedure a control liner composition of chlorobutyl rubber, natural rubber and butyl tube reclaim is prepared and is also tested. During the mixing of the compositions, those of this invention are found to be superior in processing quality. Each experimental and control composition are molded and vulcanized for various times at 300° F. in a standard ASTM sheet mold to provide vulcanized samples for physical testing. The data are as follows:

| Property | Control | Experimental |
|---|---|---|
| Tensile, p.s.i. (ASTM D 412) cured for: | | |
| 15' at 300° F | 630 | 600 |
| 30' at 300° F | 820 | 800 |
| 45' at 300° F | 900 | 850 |
| 60' at 300° F | 950 | 810 |
| 75' at 300° F | 850 | 880 |
| Modulus at 300% (ASTM D 412) cured for: | | |
| 15' at 300° F | 280 | 200 |
| 30' at 300° F | 400 | 300 |
| 45' at 300° F | 450 | 330 |
| 60' at 300° F | 550 | 370 |
| 75' at 300° F | 550 | 380 |
| Elongation, percent (ASTM D 412) cured for: | | |
| 15' at 300° F | 660 | 940 |
| 30' at 300° F | 540 | 830 |
| 45' at 300° F | 520 | 820 |
| 60' at 300° F | 490 | 720 |
| 75' at 300° F | 450 | 730 |
| Mooney scorch LR at 280° F. (ASTM D 646): | | |
| IM | 44 | 34 |
| MV | 34 | 27 |
| $T_5$ | 9¾ | 7 |
| 30 | 15¾ | 19¼ |
| Mooney viscosity (raw stock): ml., 4' at 212° F | 48 | 38 |
| Staining (ASTM D 1148) | No | No |
| Duro hysteresis block | 50 | 50 |
| Adhesion (ASTM D 413), lbs | 35 | 35 |
| Air diffusion at 35° C. (ASTM D 814) (mil. ft./day, p.s.i.) | 0.00114 | 0.00031 |

The above data shows that liner composition cures nicely to provide a snappy vulcanizate having, as compared to the control, equivalent tensile and heat-generating characteristics, a lower and flatter modulus characteristic, higher elongation, a "flat" cure characteristics where physical properties do not change substantially over a range of cure times, equivalent adhesion and air diffusion resistance about four times as good as the control. The above data indicate that a broad range of cure cycles from about 15 to 75 minutes or more at 300° F. would be satisfactory for this material. The flat cure characteristics is an advantage since cure cycles are somewhat longer for the larger size tires than, for example, passenger tires. Only the combination of the mercaptoimidazoline curative with magnesium oxide has these cure rate characteristics since other metal oxides substituted for magnesium oxide seem to provide either undercure or scorchy characteristics.

EXAMPLE II

The liner composition prepared as described in example I is incorporated in a number of heavy duty 11×22.5 and 11×24.5 tubeless truck tires (all 12-ply rating). This is accomplished by calendering the experimental liner composition into a sheet 0.060 inch thick and then laminating such sheet on the calender with a second "step-off" sheet 0.20 inch thick of the same standard truck carcass rubber (based on natural rubber) as is utilized in the other plies of the same tire and the thus-prepared composite sheet is applied to the tire drum (surface of experimental rubber applied to the drum) by the single-wrap or double-wrap technique (as indicated below). No adhesives or solvent are necessary to effect incorporation and adhesion of the liner ply. The control tires in each case are provided in a similar manner with a homogeneous or single-layer liner sheet 0.080 inch thick composed of the control chlorobutyl/natural/butyl reclaim standard or control liner composition. In some of the tires, the thickness of the experimental half-layer is reduced to only 0.030-inch gauge and the resulting composite liner ply is double wrapped on the tire-building drum. The difference in the thickness (0.060 or 0.030-inch guage for the experimental vs. 0.080-inch gauge for the control) takes advantage of the superior resistance to air diffusion of the liner composition of this invention. The tires in this experiment are otherwise built according to standard production practices on production equipment. The tire molds employed provide either a lug-type or highway-type ribbed tread design. The resulting green tires are cured conventionally employing a cure equivalent to 360 minutes at 300° F. (based on measured or estimated liner temperatures and allowing a doubling of time for every 18° F. of temperature above 300° F). Some of the experimental tires (marked by * in the data below) are aged in an air oven at 158° F. for two weeks before being tested. All of the tires are tested on an indoor tire-testing machine under standard procedures employing a smooth-drive wheel with the test commencing at 80 percent load and the load increased 20 percent for every 24 hours of the test until failure of the tire occurs. The data are as follows:

LINER

| Tire Size & Tread | Thickness | Miles to failure |
|---|---|---|
| 11×22.5 (lug) | Composite 0.069 Liner 0.020 Carcass | 4,949, *4,509 (duplicate tires) |
| 11×22.5 (ribbed) | 0.080 (Control) | *3,955 |
| 11×24.5 (ribbed) | Composite 0.030 liner 0.020 carcass Double wrapped | 4,255 |
| 1×24.5 (ribbed) | Duplicate above | 4,150 |

EXAMPLE III

In a similar fashion, a number of passenger tires are built of the two-ply OEM quality some of which are built with conventional rayon cord bias-type construction and the remainder of which are conventional polyester cord bias-type construction. All such tires are prepared with SBR type tread and carcass compounds. Such tires (control) normally are provided with a chlorobutyl/natural/reclaim butyl type of liner ply of 0.060-inch gauge. In this experiment, a composite liner ply of this invention is substituted for the latter and consists of a sheet 0.044 inch thick of the composition of example I calendered to a stepoff sheet a 0.022 inch thick of the standard SBR carcass composition. The resulting experimental and control tires are given a conventional production-type cure equivalent to a cure of 82 minutes at 300° F.

Such tires are tested on the indoor tire-testing machine using a cleated wheel operated at a speed equivalent to a vehicle speed of 40 m.p.h. with the tires under 100 percent of rated load and inflated with air to 40 p.s.i. pressure. In this test, the data are as follows:

| Tire: | Miles to destruction (average of tires tested) |
|---|---|
| Rayon | 5,825 |
| Polyester* | 6,455 |
| Control | 3,000 |

*Includes one tire which lasted 7,050 miles, highest known mileage ever attained by a 2-ply tire under this high severity test.

EXAMPLE IV

The passenger tire test of example III is repeated but the thickness of the experimental half-layer in the composite liner is reduced to 0.022 inch making a composite liner ply totaling only 0.044 inch in thickness. The average failure mileage of the resulting rayon tires is 3,991 miles and the polyester tires are somewhat better at an average failure mileage of 4,829 miles. These latter values are still superior to the standard control tires of example II which averaged 3,000 miles at failure.

EXAMPLE V

A number of OTR (off-the-road) tires 37.5×39 (32-ply rating) are built employing a composite liner ply totaling 0.100 inch in thickness. In half the number of experimental tires, the composite liner ply is made up of a sheet 0.060 inch thick of composition of example I calendered to a sheet 0.040 inch thick of the same natural rubber OTR carcass stock employed in the remaining internal plies of the tire. The other half of the tires have the gauges of the two sheets reversed. The tires are given a cure equivalent to 500 minutes at 300° F. Inspection of the liners of all cured tires show they are entirely free of blemish or defects and the tires otherwise are satisfactory in high severity service. This experiment is a most severe test of the stability of the experimental liner composition since tires as large as these are very thick requiring quite long mold-curing and post-curing cycles to vulcanize all plies to a state of cure approximating optimum cure. The flat-curing characteristics (see example 1) and great stability of the liner composition of this invention are valuable assets in producing tires as large as these.

We claim:

1. In a pneumatic tire, the improvement which consists of a vulcanized rubber liner ply overlying all internal tire surfaces exposed in service to pressurized gas and comprising, as essential rubbery constituents, a blend consisting of from about 30 to about 40 parts/weight of a halogenated butyl rubber, from about 20 to about 35 parts/weight of a rubbery epihalohydrin homopolymer, and from about 35 to about 55 parts/weight of a butyl tube reclaimed rubber, from about 40 to about 80 parts/weight of a soft, medium structure carbon black for every 100 parts/weight of said rubbery constituents, and a nonsulfur vulcanization system consisting of from about 0.25 to about 1.5 parts/weight of a mercaptoimidazoline curative and from about 0.75 to about 4 parts by weight of magnesium oxide, each for every 100 parts/weight of said rubbery constituents said butyl rubber of the halogenated and reclaimed ingredients being a copolymer of isobutylene and isoprene containing from about 0.5 to 3 mol percent isoprene residues and said halogenated butyl rubber having from about 25 to about 100 percent of its former unsaturated groupings saturated by the addition of a molecular halogen of atomic weight above 35.

2. An improved tire as defined in claim 1 and further characterized by said tire being a rubber and fabric tubeless tire, by said halogenated butyl rubber being a chlorobutyl rubber, by said rubbery epihalohydrin homopolymer being a homopolymer of epichlorohydrin, and by said carbon black being a soft, medium structure thermal black.

PO-1050
(5/69)

UNITED STATES PATENT OFFICE
CERTIFICATE OF CORRECTION

Patent No. 3,586,087          Dated June 22, 1971

Inventor(s) James W. Messerly, and LeRoy J. Vandenberg

It is certified that error appears in the above-identified patent and that said Letters Patent are hereby corrected as shown below:

Col. 2, line 17, "hear" should read --heat--.

Col. 4, line 36, "evident" should read --evidence--.

Col. 6, line 41, "0.060" should read --0.066--

Signed and sealed this 12th day of September 1972.

(SEAL)
Attest:

EDWARD M. FLETCHER, JR.　　　　　　　　　ROBERT GOTTSCHALK
Attesting Officer　　　　　　　　　　　　Commissioner of Patents